United States Patent
Wilson et al.

(10) Patent No.: US 6,242,720 B1
(45) Date of Patent: Jun. 5, 2001

(54) CONTROL FOR ELECTRIC WATER HEATER

(75) Inventors: Larry E. Wilson, Marion; Dennis L. Harris, Bluffton, both of IN (US)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 09/220,810

(22) Filed: Dec. 23, 1998

(51) Int. Cl.$^7$ .................................................. K05B 3/02
(52) U.S. Cl. .............................................................. 219/486
(58) Field of Search ..................... 219/486, 482, 219/483, 489, 492, 491, 494, 570; 392/39, 441, 447, 449, 451, 454

(56) References Cited

U.S. PATENT DOCUMENTS

| | | | |
|---|---|---|---|
| 4,145,769 | * | 3/1979 | MacFarlane et al. ............... 4/166 |
| 4,287,407 | * | 9/1981 | Treiber et al. ...................... 219/273 |
| 4,305,005 | * | 12/1981 | McKenney et al. ................ 307/31 |
| 4,874,926 | * | 10/1989 | Sanders ............................... 219/486 |
| 5,125,068 | * | 6/1992 | McNair et al. ..................... 392/441 |
| 5,168,546 | * | 12/1992 | Laperriere .......................... 392/454 |
| 5,388,179 | * | 2/1995 | Boyd et al. ......................... 392/451 |
| 5,442,157 | * | 8/1995 | Jackson ............................... 219/492 |
| 5,616,264 | * | 4/1997 | Nishi et al. ......................... 219/494 |
| 5,789,722 | * | 8/1998 | Zimmerman et al. ............. 219/486 |
| 5,808,277 | * | 9/1998 | Dosani et al. ...................... 219/481 |
| 5,900,177 | * | 5/1999 | Lecouras et al. ................... 219/497 |
| 5,945,018 | * | 8/1999 | Halen .................................. 219/492 |
| 5,949,960 | * | 9/1999 | Hall ..................................... 392/454 |

* cited by examiner

Primary Examiner—Teresa Walberg
Assistant Examiner—Daniel Robinson

(57) ABSTRACT

A control for a water heater having upper and lower heating elements assures that the upper heating element is not activated until certain control conditions are met. The control first determines whether the temperature sensed by a sensor in the vicinity of the upper heating element has reached a predefined set point temperature for that sensor. The control thereafter determines whether the temperature sensed by the sensor declines at a rate greater or equal to a threshold rate of temperature change before authorizing any activation of the upper heating element.

20 Claims, 3 Drawing Sheets

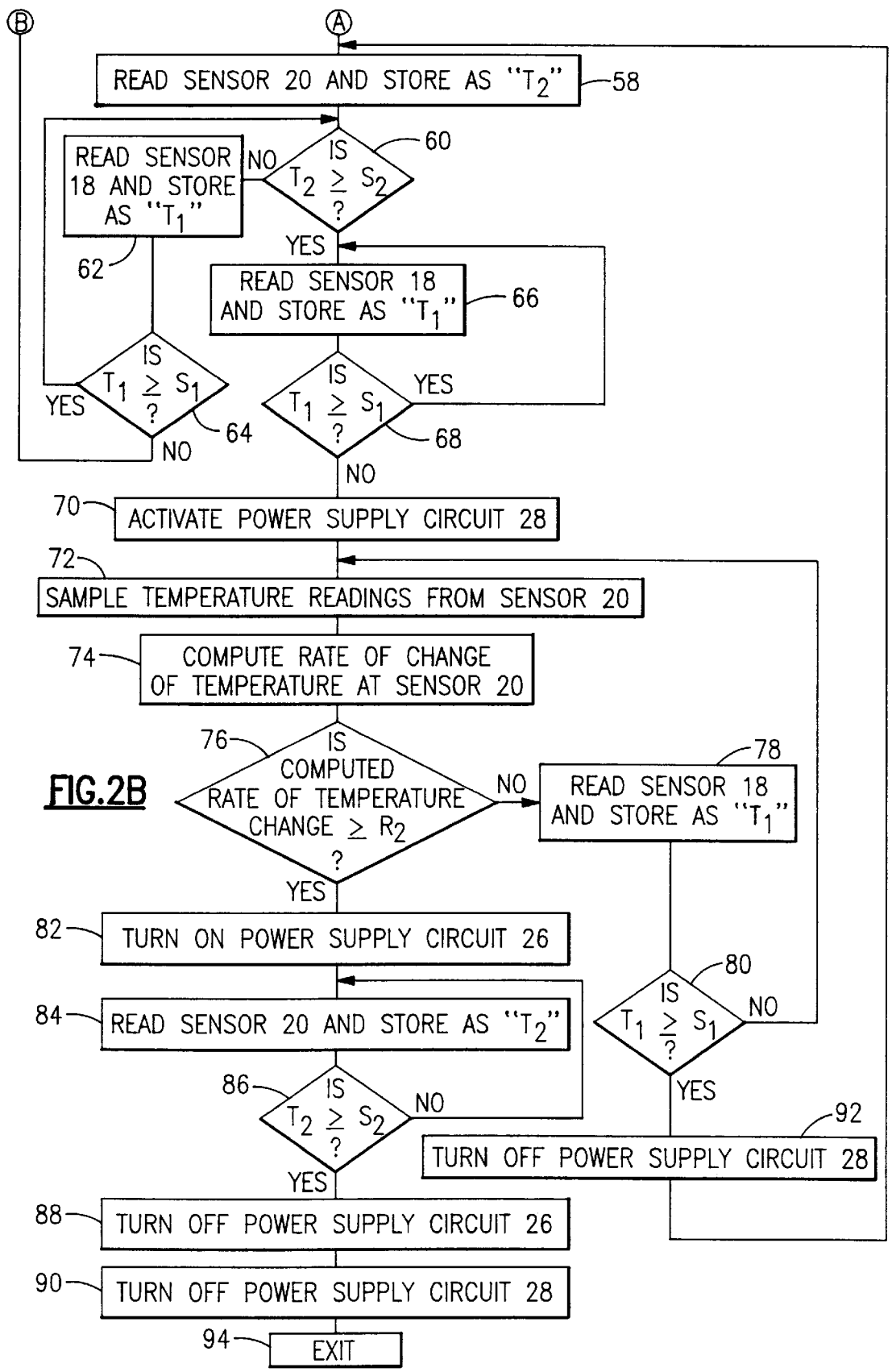

CONTROL FOR ELECTRIC WATER HEATER

BACKGROUND OF THE INVENTION

This invention relates to the control of electric water heaters and, in particular, to the control of dual heating elements often found in such water heaters.

Electric water heaters often have both an upper heating element and a lower heating element extending into a tank containing the water that is to be heated. The upper heating element heats water in the upper portion of the tank whereas the lower heating element heats water in the lower portion of the tank. The heating of the water by each heating element is premised on there being sufficient water in the tank to submerse both heating elements. There may, however, be one or more situations where the upper heating element is not immersed in water. One such situation can occur when the tank is being initially filled with water. The air in the tank will be compressed as the tank is initially filled with water. The compressed air may lead to a premature cut-off of the water feed to the tank before the water level rises above the upper heating element.

A subsequent demand to heat the water in the tank will normally lead to activation of the upper heating element. The thus activated heating element will remain on until a sensor associated with the heating element reaches set point temperature. This may lead to a premature burning out of the upper heating element since it will most likely remain on for an extended period of time in an attempt to heat the air surrounding the sensor to the set point temperature.

SUMMARY OF THE INVENTION

The present invention provides a control that assures that the upper heating element of an electric water heater cannot be activated when the upper heating element is not submersed in water. The control preferably includes a processor which notes when electric power to the water heater system is established. The processor proceeds to activate only the lower heating element of the water heater system when the processor notes that power has been established. The processor requires the heated water to preferably reach a predefined set point. When the predefined set point is reached, the processor proceeds to inquire whether use of the upper heating element can be authorized to provide heat on subsequent heating cycles. Authorization to use the upper heating element in subsequent heating cycles is preferably conditioned on the sensor associated with the upper heating element demonstrating a certain temperature behavior. This temperature behavior preferably includes demonstrating that a rate of temperature change as measured by a sensor associated with the upper heating element is greater than a threshold rate of temperature change for the sensor.

BRIEF DESCRIPTION OF THE DRAWINGS

The invention will be apparent from the following description with the accompanying drawings, in which:

FIGS. 2A–2B illustrate a control process executable by the processor of FIG. 1 for controlling the dual heating elements of FIG. 1.

DESCRIPTION OF THE PREFERRED EMBODIMENT

Figure 1:
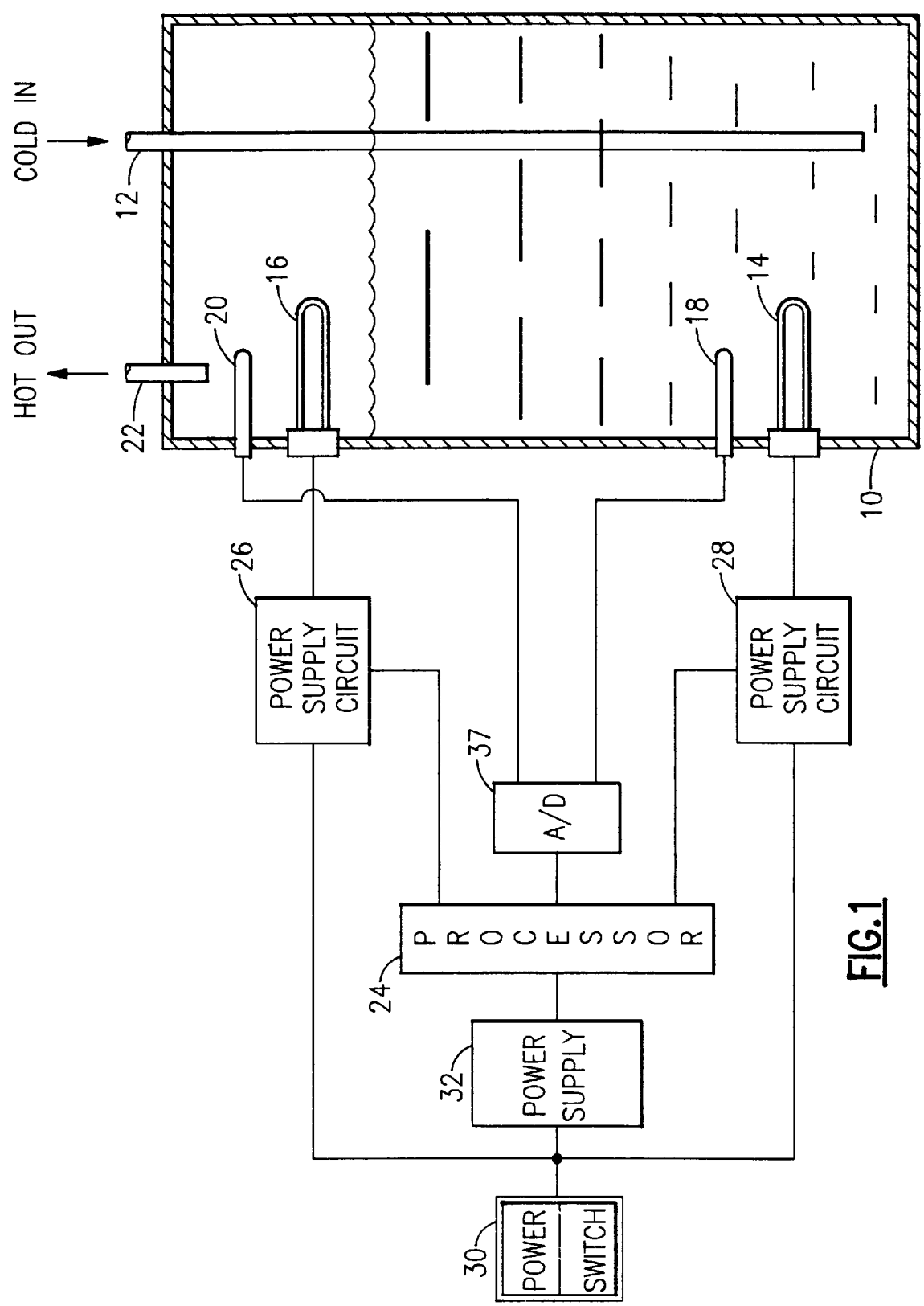
FIG. 1 illustrates a water heater tank having dual electric heating elements controlled by a processor associated therewith.

Referring to FIG. 1, an electric water heater tank 10 is seen to receive cold water from a cold water inlet pipe 12. The cold water is normally heated by a lower heating element 14 and an upper heating element 16. The lower heating element 14 has a temperature sensor 18 associated therewith whereas the upper heating element 16 has a temperature sensor 20 associated therewith. Water heated by the lower and upper heating elements 14 and 16 normally exits from the water heater tank 10 via a hot water outlet pipe 22 located at the top of the tank.

The water level in the tank 10 is shown to be below the upper heating element 16. This condition can occur when the tank 10 is initially filled with water to a point where the air in the tank is pressurized so as not to allow the water to rise above the upper heating element 16.

A processor 24 controls the amount of electrical power applied to the upper heating element 16 by a power supply circuit 26. The processor 24 also controls a power supply circuit 28, which provides electrical power to the lower heating element 14. It is to be appreciated that the power supply circuits 26 and 28 provide relatively high amperage current to the respective heating elements. This electrical current is normally produced by transformers that receive AC power from an AC power switch 30 associated with the electric water heater system of FIG. 1. These power supply circuits are switched on or off by signals from the processor 24. The processor 24 receives its power from a power supply 32. The power supply 32 also receives AC power from the AC power switch 30. It is hence to be appreciated that the power supply 32 as well as the power supply circuits 26 and 28 will only receive electrical power when the AC power switch 30 is switched on.

The processor 24 receives temperatures from the upper temperature sensor 20 as well as the lower temperature sensor 18 via an analog to digital circuit 34. As will be explained in detail hereinafter, the processor will require temperature sensor readings from these temperature sensors at various points during an executable control process which will be explained hereinafter. It is to be appreciated that processor 24 may work directly with the temperature sensors if they are capable of providing digital temperatures at appropriate voltage levels directly to the processor. In this latter event, there is no need for the analog to digital circuit 34.

Figure 2A:
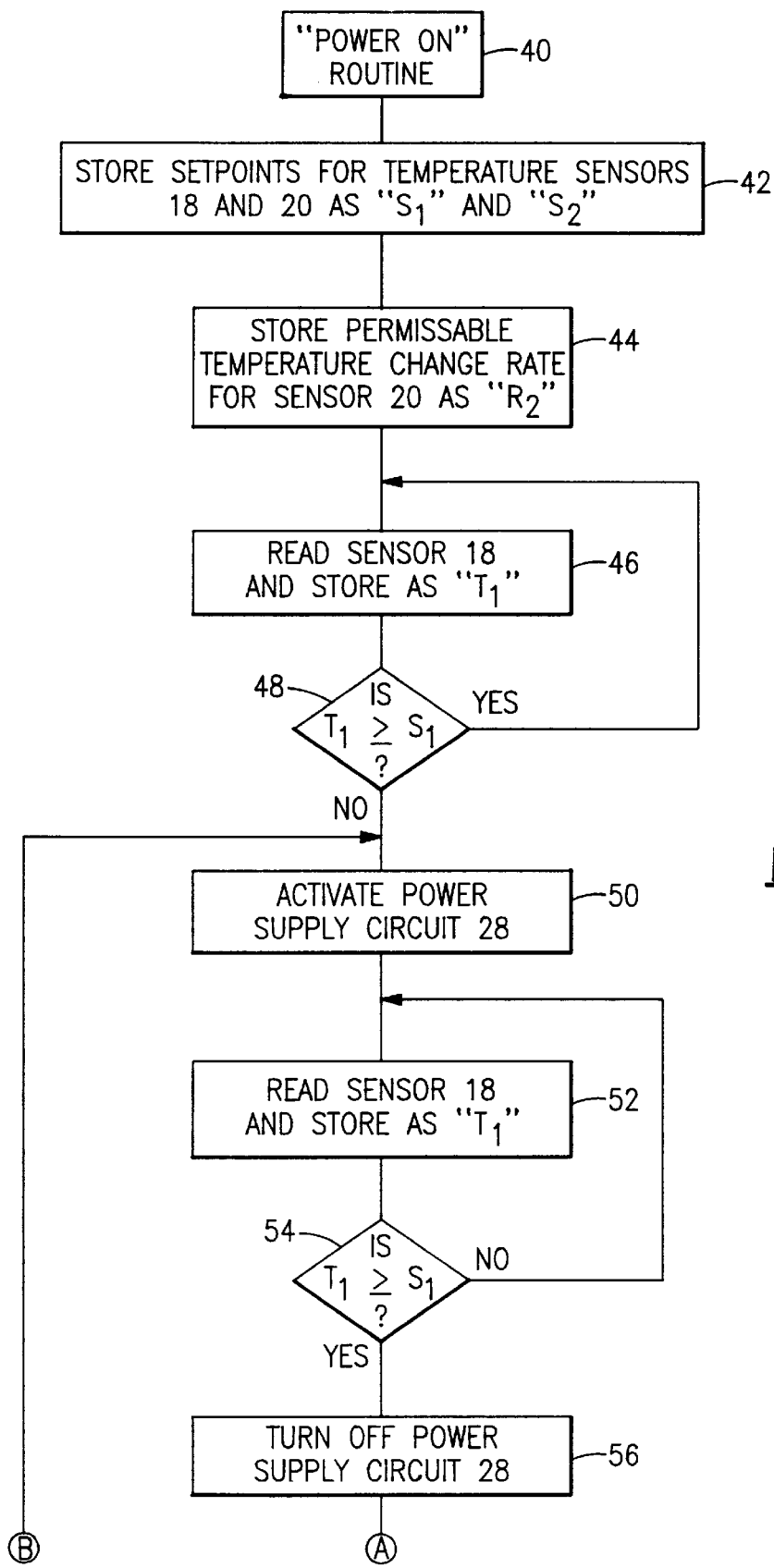

The process executable by the processor 24 is illustrated in FIGS. 2A through 2B. The process begins with a step 40 wherein the processor 24 executes a "power on" routine at such time as power is provided to the processor 24 from the power supply 32. As has been previously noted, power will be provided by the power supply 32 at such time as the power switch 30 is switched on. The processor 32 will at such time power up and proceed to a stored program which begins with a step 42. Referring to step 42, the processor will store the set points for the temperature sensors 18 and 20 as "$S_1$" and "$S_2$". The programmed processor will next proceed to store a threshold temperature change rate for the sensor 20 as "$R_2$". The particular value of $R_2$ will be a temperature change rate that the sensor 20 normally experiences when immersed in water. This will be more fully explained hereinafter.

After having stored the set point values for the temperature sensors and, moreover, having stored the threshold temperature change rate for the sensor 20, the processor will proceed to a step 46 and read the current value of sensed temperature from the sensor 18. It is to be understood that this particular value may already be in the processor's memory 24 as a result of having been timely read shortly before the processor executes step 46. The processor proceeds to a step 48 and inquires whether the value of $T_1$ is equal to or greater than the set point value of sensor 18 as stored in $S_1$. It is to be appreciated that the sensed temperature from the sensor 20 will usually be considerably below this set point when the processor is first powered up. This will normally prompt the processor to proceed to a step 50 and activate the power supply circuit 28 associated with the lower heating element 14. The processor will next, after an appropriate delay, read the sensor 18 and set the read value equal to $T_1$ in a step 52. The processor next inquires in a step 54 as to whether the currently stored value of the sensor temperature, $T_1$, is greater than or equal to the set point temperature value, $S_1$. In the event that the sensed temperature is less than $S_1$, the processor proceeds back to step 52 and again reads the sensor value 18 after an appropriate delay. It is to be appreciated that at some point in time the sensed temperature will have reached the set point value so as to prompt the processor to proceed from step 54 along the yes path to a step 56 and turn off the power supply circuit 28. The processor will next proceed to step 58 and read the sensed temperature from the sensor 20 and set the read value equal to "$T_2$". The processor proceeds to inquire in a step 60 as to whether the current sensed value of temperature at sensor 20, as denoted by $T_2$, is greater than or equal to the set point value for this sensor as denoted by $S_2$. It is to be appreciated that the set point value $S_2$ is normally the same or substantially the same as the set point value $S_1$. The sensed temperature $T_2$ should hence normally be equal to the set point value for sensor 20 when the water has just been heated by the lower heating element 14. This will not however be the case if the water level in the tank 10 has not reached the upper temperature sensor 20. The temperature sensor 20 will in this case be surrounded by pressurized air which will not be at or near set point temperature, $S_2$, for this sensor. This will prompt the processor to proceed along the no path out of step 60 to a step 62 wherein the lower temperature sensor 18 is again read with the thus read value being set equal to $T_1$. If the sensed value of temperature from the sensor 18 is still equal to the set point value, then the processor will proceed out of a step 64 and return to step 60. Since the temperature sensor 16 remains out of water, the processor will again proceed to step 62 and hence step 64. At such time as the temperature at the sensor 18 drops below the set point value, $S_1$, the processor will proceed out of step 64 and return to step 50 wherein the power supply circuit 28 is again activated.

The water in the tank will again be brought up to temperature in steps 50–56 before the processor again checks the temperature at the sensor 20. Steps 60 through 64 will again be executed as long as the water level in tank 10 remains below the sensor 20. It is to be appreciated that at some point the water heater will have experienced a demand for hot water. At such time, the pressure in the hot water outlet pipe will have been reduced so as to thereby allow the water to rise in the tank 10 and exit into the hot water outlet pipe 22. When this occurs, cold water will normally enter the tank from the water inlet pipe 12 so as to thereby drop the temperature of the water surrounding the sensor 18. When this occurs, the reading of sensed temperature of the sensor 18 in step 52 will produce a temperature value below set point. The processor will hence note the lower sensed temperature in step 54 and return to step 52 to again read the sensed temperature. The comparisons of the sensed temperature will continue to occur in step 54 until the heating element 14 has heated the water to set point temperature. At this point, the processor will proceed out of step 54 and turn off the power supply circuit 28 associated with the lower heating element 14. The processor will now proceed to step 58 and read the sensed temperature value of sensor 20. This temperature value, as stored in $T_2$, will be compared with the set point temperature value $S_2$ in step 60. It is to be appreciated that the sensor 20 should now be fully immersed in water as a result of the previous demand for water having filled the tank 10. The water will moreover be at the set point temperature as a result of having been heated by the lower heating element 14. This should normally produce a sensed temperature in the sensor 20 that is at least equal to the set point temperature, $S_2$. The processor will hence proceed along the yes path to a step 66 and again read the sensor 18 and set $T_1$ equal to the read value. The processor will proceed to inquire whether $T_1$ is equal to or greater than $S_1$ in a step 68. The processor will most likely return to step 66 since the water surrounding sensor 18 will have just been heated to set point temperature. As long as the read temperature of the sensor 18 remains at or above set point, $S_1$, the processor will continue to execute steps 66 and 68.

It is to be appreciated that at some point, a demand for hot water will again be made on the system of FIG. 1. This will prompt cold water to again enter the tank 10 causing the water temperature to drop at sensor 18. When this occurs, the processor will proceed to step 70 and activate the power supply circuit 28. This will prompt the lower heating element 14 to begin heating the cold water introduced into the tank 10. The processor will proceed to a step 72 and sample several temperature readings from sensor 20 over a predetermined period of time. The thus sampled temperature readings over a predetermined period of time are used by the processor in a step 74 to compute the rate of temperature change being experienced at the sensor 20. The processor proceeds from step 74 to compare the computed rate of temperature change with the threshold temperature change rate, $R_2$, in a step 76. The threshold temperature change rate $R_2$ will preferably be a temperature change rate that is acceptably less than what is normally experienced by the sensor 20 when fully immersed in water following the introduction of cold water into the tank 10. It is to be appreciated that the actual value of $R_2$ can be arrived at empirically for a given hot water system having a given size tank and cold water flow rate. It is furthermore to be appreciated that any such defined rate will be substantially greater than the rate of temperature decline produced by a sensor not filly immersed in water that is at less than the set point temperature, $S_2$.

The water in the tank 10 should be below the set point, $S_1$, due to the recent introduction of cold water. The computed rate may not however be above the threshold rate, $R_2$, if the temperature, $T_2$, has not fallen significantly due to the initial introduction of the cold water or if the sensor 20 is still not fully immersed in water. If this occurs, the processor will proceed along the no path out of step 76 to a step 78 and read the sensor 18 and set the read temperature value equal to $T_1$. The processor will proceed to a step 80 and normally note that the temperature of sensor 18 is below set point due to the recent introduction of cold water. This should prompt the processor to normally loop back to step 72 and again sample temperature readings at sensor 20 and compute the rate of temperature change in step 74.

The computed rate of temperature change in step 74 should at some point be above the threshold rate $R_2$ if the sensor 20 is operating correctly and is immersed in water sufficiently below set point temperature, $S_2$, so as to produce the computed rate. When this occurs, the processor proceeds to a step 82 and activates the power supply circuit 26 for the upper heating element 16. This will be the first application of voltage to the upper heating element following the power on routine of step 40. The processor will proceed to a step 84 and again read the sensor 20 and set the read value equal to $T_2$. The processor will now proceed to a step 86 and inquire as to whether the read value is equal to the set point, $S_2$, for the sensor 20. If the read value is not equal to set point, the processor will return to step 84. Since the heating element 16 is now heating the water around sensor 20, the sensor 20 should sense an increasing water temperature in step 84. This should eventually result in the sensed temperature being equal to the set point temperature $S_2$. When this occurs, the processor will proceed out of step 86 and turn off the power supply circuit 26 for the upper heating element 16 in a step 88. The processor will also turn off the power supply circuit 20 for the lower heating element 14 in a step 90. The processor will next proceed to an exit step 94. At this point, the processor will proceed to a normal control mode of operation whereby both heating elements 14 and 16 are used for subsequent heating of the water in the tank 10.

Referring again to step 80, in the unlikely event that the sensed temperature of the sensor 18 has reached its respective set point, $S_1$, before the computed rate of step 74 exceeds threshold rate $R_2$ in step 76, then the processor will proceed to turn off the power supply circuit 28 for the lower heating element 14 in a step 94. The processor will in this case proceed back to step 58 and again read the sensor 20. The processor will thereafter compare the value of $T_2$ with the set point temperature $S_2$. It is to be appreciated that as long as the value of $T_2$ remains equal to or greater than $S_2$, the processor will proceed to step 66 and read the current value of sensor 18 before doing a comparison with the set point temperature $S_1$. The power supply circuit 28 will again be activated in step 70 and the processor will again sample temperatures of the sensor 20 in step 72 and compute a rate of change of temperature in step 74. The processor will proceed through steps 76–92 as has been previously described depending on the results of the comparison in step 74.

Referring again to step 60, in the event that the read value of step 58 as stored in $T_2$ is below the set point temperature, $S_2$, the processor will proceed to execute steps 62 and 64 as has been previously described. If the read value of sensor 18 in step 62 falls below the set point temperature, $S_1$, the processor will proceed along the yes path and return to step 50 wherein the power supply circuit is again activated before proceeding through steps 54 and 56 and again encountering step 58. The processor will next proceed to step 60 so as to determine what to do depending on the value of temperature $T_2$. The various paths out of step 60 have heretofore been described. These paths include execution of steps 66 through 92 wherein the computed rate of temperature change is determined to exceed the threshold rate so as to authorize use of the upper heating element. The paths out of step 60 can also result in the above not occurring, in which case the processor continues to only use the lower heating element to heat the water in the tank 10.

It is to be appreciated from the above that a particular executable process by the processor 24 has been disclosed for allowing water within the tank 10 to only be heated by the lower heating element until certain sensed temperature conditions have been met at the upper temperature sensor 20. In this manner, the upper heating element 16 will not have been allowed to participate in any heating of the water within the tank 10 until such a time as it has been fully immersed in water within the tank as indicated by sensor 20 passing the temperature tests of step 60 as well as the temperature change rate test of steps 66 through 70.

It is to be appreciated that a particular embodiment of the process of FIGS. 2A and 2B has been described. Alterations, modifications and improvements thereto will readily occur to those skilled in the art. Accordingly, the foregoing description is by way of example only and the invention is to be limited by the following claims and equivalents thereto.

What is claimed is:

1. A process executable by a control system for controlling at least two heating elements in a water heating system wherein a first heating element is positioned below a second heating element in a tank within the system, said process comprising the steps of:

sensing the temperature of the water in the vicinity of a first sensor in the tank;

providing power to the first heating element so as to thereby heat the water in the tank when the sensed temperature of the water in the vicinity of the first sensor is below a predefined set point temperature for the first sensor;

noting when the sensed temperature of the water in the vicinity of the first sensor reaches the predefined set point temperature for the first sensor;

proceeding to read the sensed temperature of a second sensor when the sensed temperature of the water in the vicinity of the first sensor reaches the predefined set point temperature for the first sensor; and automatically authorizing provision of power to the second heating element only after the sensed temperature of the second sensor reaches a set point temperature for the second sensor.

2. The process of claim 1 further comprising the steps of:

sensing the temperature of the water in the vicinity of the first sensor in the tank when the sensed temperature of the second sensor does not reach the set point temperature for the second sensor; and returning to said step of reading the sensed temperature of the second sensor when the sensed temperature of the water in the vicinity of the first sensor remains at or above the predefined set point temperature for the first sensor.

3. The process of claim 1 wherein said process is implemented by a programmed processor which controls the first and second heating elements, said process being the first process to control the first and second heating elements that is implemented by the programmed processor following an application of power to the programmed processor.

4. The process of claim 1 wherein said step of proceeding to read the sensed temperature of the second sensor comprises the steps of:

sampling the sensed temperature of the second sensor;

proceeding to said step of authorizing provision of power to the second heating element only when the sampled sensed temperature of the second sensor declines at a rate greater than or equal to a predefined rate of change of temperature.

5. The process of claim 4 wherein said step of sampling the sensed temperature of the second sensor includes:

sampling the sensed temperature of the second sensor at least twice so as to produce at least two sampled temperatures;

computing the rate of change of the sampled sensed temperatures; and comparing the computed rate of change of the sampled sensed temperatures with a predefined rate of change of temperature.

6. The process of claim 5 comprising the steps of:
sensing the temperature of the water in the vicinity of the first sensor in the tank when the computed rate of change of sampled temperature is less than the predefined rate of change of temperature; and
repeating said steps of sampling the sensed temperature of the second sensor, computing the rate of change of the sampled sensed temperatures, and comparing the computed rate of change of sampled sensed temperatures with a predefined rate of change of temperature as long as the sensed temperature of the water in the vicinity of the first sensor remains below the set point temperature for the first sensor.

7. The process of claim 6 further comprising the steps of:
reading sensed the temperature of the second sensor when the temperature of the water in the vicinity of the first sensor reaches the set point temperature for the first sensor; and
determining whether to proceed to said step of sampling the sensed temperature of the second sensor in response to the read temperature of the water in the vicinity of the first sensor.

8. The process of claim 1 wherein said step of proceeding to sense the temperature of the second sensor comprises:
sensing the temperature of the water in the vicinity of the first sensor when the sensed temperature of the second sensor reaches the set point temperature for the second sensor;
sampling the sensed temperature of the second sensor only when the sensed temperature of the water in the vicinity of the first sensor drops below the set point temperature for the first sensor;
computing the rate of change of the sampled sensed temperatures of the second sensor;
comparing the computed rate of change of the sampled sensed temperatures with a predefined rate of change of temperature; and
authorizing provision of power to the second heating element when the computed rate of change of sampled sensed temperatures exceeds the predefined rate of change of temperature.

9. The process of claim 8 comprising the steps of:
sensing the temperature of the water in the vicinity of the first sensor in the tank when the computed rate of change of sampled sensed temperature of the second sensor is less than the predefined rate of change of temperature; and
repeating said steps of sampling the sensed temperature of the second sensor, computing the rate of change of the sampled sensed temperatures, and comparing the computed rate of change of sampled sensed temperatures with a predefined rate of change of temperature as long as the sensed temperature of the water in the vicinity of the first sensor remains below the set point temperature for the first sensor.

10. The process of claim 9 further comprising the steps of:
reading the sensed temperature of the second sensor when the temperature of the water in the vicinity of the first sensor reaches the set point temperature for the first sensor; and
determining whether to proceed to said step of sampling the sensed temperature of the second sensor in response to the read temperature of the water in the vicinity of the first sensor.

11. A system for controlling at least two electrical heating elements in a water heater tank wherein the first electrical heating element is positioned below the second heating element, said system comprising:
a sensor for sensing the temperature in a portion of the tank normally heated by the second electrical heating element;
a power supply connected to said second electrical heating element; and
a processor connected to said power supply and to said sensor, said processor being operative to determine whether a read value of sensed temperature from the sensor has reached a predefined set point temperature for the sensor, said processor being furthermore operative to authorize said power supply to supply power to said second electrical heating element only if the read value of sensed temperature from the sensor is determined to have reached the predefined set point temperature for the sensor.

12. The system of claim 11 wherein said processor is furthermore operative to sample temperatures produced by the sensor for sensing the temperature in the portion of the tank normally heated by the second electrical heating element following a determination that a predefined set point temperature for the sensor has reached the predefined set point temperature for the sensor, and wherein said processor is thereafter operative to authorize said power supply to supply power to said second electrical heating element if the sampling of temperatures from the sensor indicates a rate of decline in temperature that is greater than a threshold rate of temperature change.

13. The system of claim 12 further comprising:
a second sensor for sensing the temperature of the water in a portion of the tank normally heated by the first electrical heating element; and wherein
said processor is first operative to determine whether a read value of temperature of the second sensor has dropped below a set point temperature for the second sensor before being operative to sample temperatures produced by the sensor for sensing the temperature of the water in the portion of the tank normally heated by the second heating element.

14. The system of claim 13 further comprising:
a power supply for said processor, said processor power supply being operative to provide power to said processor when AC power is provided to the processor power supply; and wherein
said processor is first operative to determine whether a read value of sensed temperature from the second sensor has reached a predefined set point temperature for the second sensor, said processor being operative to only proceed to determine whether a read value of sensed temperature from the sensor for sensing the temperature of the water in a portion of the tank normally heated by the second electrical element has reached a predefined set point for the sensor when the read value of the sensed temperature from the second sensor has reached the predefined set point temperature for the second sensor.

15. The system of claim 14 further comprising:
a second power supply connected to said first heating element; and wherein
said processor is operative to activate said second power supply when a read value of sensed temperature from the second sensor is below a predefined set point temperature for the second sensor and being furthermore operative to further read values of sensed temperature from the second sensor and compare to the predefined set point temperature for the second sensor until the sensed temperature for the second sensor is equal to or greater than the predefined set point temperature for the second sensor.

16. The system of claim 11 further comprising:

a power supply for said processor, said processor power supply being operative to provide power to said processor when AC power is provided to the processor power supply;

a second sensor for sensing the temperature of the water in a portion of the tank normally heated by the first electrical heating element; and wherein said processor is first operative to determine whether a read value of sensed temperature from the second sensor has reached a predefined set point temperature for the second sensor, said processor being operative to only proceed to determine whether a read value of sensed temperature from the sensor for sensing the temperature in a portion of the tank normally heated by the second electrical element has reached predefined set point for the sensor when the read value of the sensed temperature from the second sensor has reached the predefined set point temperature for the second sensor.

17. The system of claim 16 further comprising:

a second power supply connected to said first heating element; and wherein said processor is operative to activate said second power supply when a read value of sensed temperature from the second sensor is below a predefined set point temperature for the second sensor and being furthermore operative to further read values of sensed temperature from the second sensor and compare to the predefined set point temperature for the second sensor until the sensed temperature for the second sensor is equal to or greater than the predefined set point temperature for the second sensor.

18. The system of claim 17 wherein said processor is furthermore operative to sample temperatures produced by the sensor for sensing the temperature in the portion of the tank normally heated by the second heating element following a determination that a predefined set point temperature for the sensor has reached the predefined set point temperature for the sensor, and wherein said processor is thereafter operative to authorize said power supply to supply power to said second electrical heating element only if the sampling of temperatures from the sensor indicates a rate of decline in temperature that is greater than a threshold rate of temperature change.

19. The process of claim 1 wherein the first sensor is located in the vicinity of the first heating element so as to thereby sense the temperature of the water in the vicinity of the first heating element and wherein the second sensor is located in the vicinity of the second element so as to thereby sense the temperature of the environment in the vicinity of the second heating element.

20. The process of claim 19 wherein the second sensor is located above the second heating element.

* * * * *